United States Patent [19]

Matsumoto et al.

[11] Patent Number: 6,008,908
[45] Date of Patent: *Dec. 28, 1999

[54] FACSIMILE APPARATUS AND COMMUNICATION METHOD THEREOF

[75] Inventors: Masafumi Matsumoto, Takaichi-gun; Shigekazu Fujiwara, Yamatokoriyama; Ryoji Kambara; Koji Shimada, both of Higashihiroshima; Morihiro Katsurada, Shijonawate; Hiroshi Yamada, Higashihiroshima, all of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,618

[22] Filed: Feb. 26, 1997

[30] Foreign Application Priority Data

Mar. 25, 1996 [JP] Japan .................................. 8-068782

[51] Int. Cl.$^6$ ...................................................... H04N 1/32
[52] U.S. Cl. .................... 358/442; 358/468; 379/100.15; 379/100.06
[58] Field of Search ................................... 358/442, 468, 358/434, 435, 438, 439, 440, 443, 444; 379/100.15, 100.16, 100.06

[56] References Cited

U.S. PATENT DOCUMENTS

| | | | |
|---|---|---|---|
| 4,652,933 | 3/1987 | Koshiishi | 358/442 |
| 4,850,008 | 7/1989 | Berg et al. | 379/100.15 |
| 4,964,154 | 10/1990 | Shimotono | 379/100.15 |
| 4,991,200 | 2/1991 | Lin | 358/442 |
| 5,127,048 | 6/1992 | Pess et al. | 358/442 |
| 5,307,178 | 4/1994 | Yoneda | 358/440 |
| 5,515,175 | 5/1996 | Okada | 358/468 |
| 5,528,385 | 6/1996 | Manning | 358/442 |
| 5,530,558 | 6/1996 | Nachman | 358/442 |
| 5,598,533 | 1/1997 | Yokoda et al. | 395/114 |
| 5,602,908 | 2/1997 | Fan | 379/199 |
| 5,666,403 | 9/1997 | Telibasa | 379/100.15 |
| 5,677,946 | 10/1997 | Beever | 379/100.15 |
| 5,696,600 | 12/1997 | Perkins | 358/442 |
| 5,715,301 | 2/1998 | Terasaki et al. | 358/434 |
| 5,822,406 | 10/1998 | Brown | 379/100.16 |
| 5,844,692 | 12/1998 | Jeon | 358/442 |
| 5,872,901 | 2/1999 | Konno et al. | 395/114 |
| 5,892,815 | 4/1999 | Yoshida et al. | 379/100.16 |

FOREIGN PATENT DOCUMENTS

| | | | |
|---|---|---|---|
| 19510929 | 3/1994 | Germany | H04N 1/00 |
| 63-187960 | 3/1988 | Japan . | |
| WO9323949 | 11/1993 | WIPO | H04N 1/00 |
| WO9519089 | 7/1995 | WIPO | H04N 1/38 |
| WO9528054 | 10/1995 | WIPO | H04N 1/32 |

*Primary Examiner*—Amelia Au
*Assistant Examiner*—Jingge Wu

[57] ABSTRACT

A telephone line interface section, which has a selector switch for selectively connecting two of a facsimile section, a telephone line and an information unit such as a personal computer, is provided. The telephone line interface section is provided with a telephone line monitor which detects an ON/OFF state of a start switch for directing the facsimile section to be operated and detects existence or non-existence of a DC loop current which is a connecting signal at the time when the facsimile section is connected to an external telephone switchboard via the telephone line. The selector switch connects the facsimile section to the information unit based upon the telephone line monitor when the start switch is in the ON state and the connecting signal is not detected. As a result, in the case where the facsimile section is used as a scanner and printer of the information unit, the facsimile section can be simply connected to the information unit.

20 Claims, 9 Drawing Sheets

Abstract Fig.

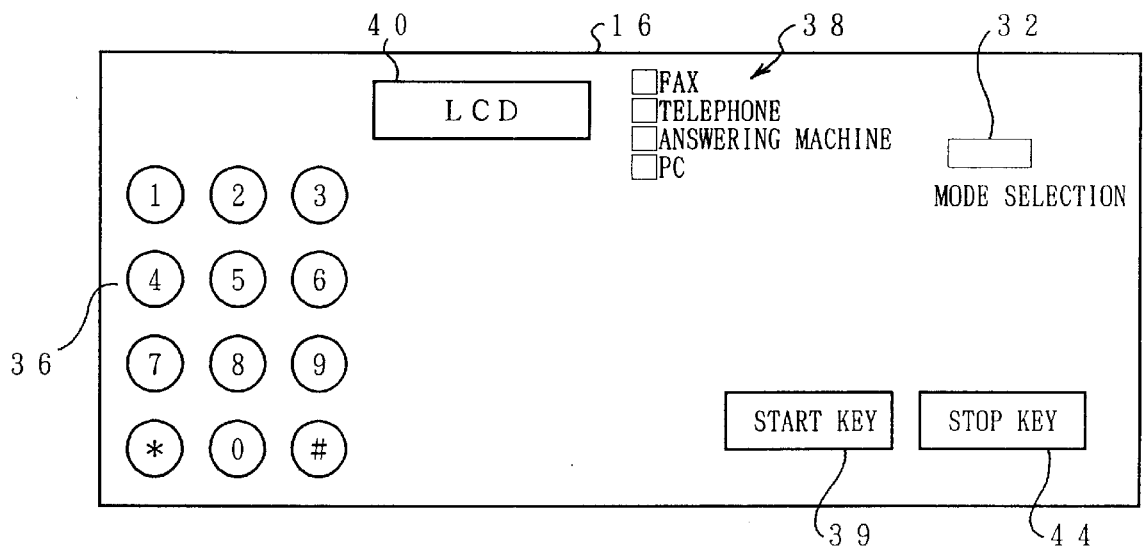
F I G. 3

FIG. 5 (a)

TRANSMISSION SOURCE INFORMATION + DATA

| TRANSMISSION SOURCE INFORMATION |
| DATA ABOUT IMAGE INFORMATION, ETC. |

FIG. 5 (b)

DATA ONLY

| DATA ABOUT IMAGE INFORMATION, ETC. |

CONNECT FAX SECTION TO INFORMATION UNIT — S11

TRANSMIT DATA IN RECEIVED RECORD
MEMORY 14 TO INFORMATION UNIT (16Hz)   (16Hz)   (16Hz)

(16Hz)  CALLER'S ID   (16Hz)   (16Hz)
        INFORMATION
        IDENTIFYING
        SIGNAL

FACSIMILE APPARATUS AND COMMUNICATION METHOD THEREOF

FIELD OF THE INVENTION

The present invention relates to a facsimile apparatus which is conveniently connected to an information apparatus such as a personal computer equipped with a modem for communication using a telephone line, and relates to a communication method thereof.

BACKGROUND OF THE INVENTION

Conventionally, Japanese Unexamined Patent Publication No. 63-187960/1988 (Tokukaisho 63-187960) discloses a communication adapter for personal computer (i.e., PC) communication in PC and facsimile (i.e., FAX) communication via a common public telephone line (i.e., telephone line).

The communication adapter has an automatic receiving device connected to the telephone line, and a first terminal which connects the PC to the automatic receiving device. The automatic receiving device automatically performs a sequential operation for receiving data via the telephone line.

The communication adapter has a second terminal connected to the FAX, and a switching device which connects the second terminal to the telephone line based upon an identifying (i.e., ID) signal representing FAX communication included in the received data.

In such a communication adapter, when the ID signal is detected by the automatic receiving device at the time of FAX communication from the telephone line, the switching device intermittently connects the FAX to the telephone line via the second terminal based upon the ID signal. As a result, data can be automatically received via the communication adapter by selectively connecting one telephone line to the PC or FAX.

However, in the above conventional arrangement, since the FAX is connected to the PC so as to be used as a scanner or a printer of the PC, not only the usual operation for FAX communication but also an operation by a user for selecting a switch are required. Therefore, there arises such a problem that the data communication is complicated.

In addition, in the above conventional arrangement, in order to use the FAX as a scanner or a printer of PC, a certain connecting function is required for connecting FAX to PC. For example, a data converting function such as RS232C is required on the FAX side for connecting the FAX to the PC. Moreover, in the case where protocol used for data communication with PC is controlled by software on the FAX side, the burden of the software is increased. As a result, there arises a problem that the cost of the FAX rises dependent on connecting functions and software.

SUMMARY OF THE INVENTION

It is an object of the present invention to provide a FAX apparatus, in which a FAX is simply connected to a PC, having a FAX modem as a communicating device, by means of one telephone line, and the FAX is used as a scanner or printer of the PC.

In order to achieve the above object, a FAX apparatus of the present invention includes:

a selector switch for selectively connecting two of a FAX section, a telephone line and an information unit having a modem which inputs/outputs a data signal including information via the telephone line;

a FAX section monitor for detecting an ON/OFF state of a start switch which directs the FAX section to be actuated;

a telephone line monitor for detecting existence or non-existence of a connecting signal when the FAX section is connected to the outside via the telephone line; and a main control section for when the ON state of the start switch is detected by the FAX section monitor and the connecting signal is not detected by the telephone line monitor, controlling the selector switch so that the FAX section is connected to the information unit.

In accordance with the above arrangement, the information included in the data signal refers to various information such as image information, sound information and character information. In the FAX section, like the normal FAX communication, in the case where the start switch is turned on according to input of a receiver's data signal such as a receiver's dial number and simplified dialing number, the connecting signal flows in the telephone line by the input of the data signal. As a result, the data communication of image information, for example, from the FAX section to an external FAX section can be executed via the selector switch and the telephone line.

Meanwhile, in accordance with the above arrangement, in addition to the normal operation, in the case where the start switch is turned on without input of the receiver's data signal, the connecting signal is not detected. However, since the start switch is turned on, the main control section, which controls the selector switch, connects the FAX section to the information unit by the selector switch based upon the detected results in the FAX section monitor and the telephone line monitor. As a result, the image information from the FAX section can be sent to the information unit via the modem.

Accordingly, in the above arrangement, when the FAX section monitor and the telephone line monitor are provided, the FAX section can be used as a scanner of the information unit without requiring a special operation besides the normal operation of the FAX section.

Therefore, compared with the conventional arrangement, the above arrangement can further reduce trouble of the operation in the FAX section when the FAX section is used as a scanner of the information unit.

A FAX control section, which stops addition of information representing a transmission source to the image information to the information unit, may be provided to the above arrangement. Namely, in the FAX control section stops the FAX section from adding an information signal, which is added in the normal FAX communication and represents a transmission source, to the image information of the information unit when image information is sent from the FAX section to the information unit.

As a result, it is prevented that the information signal is stored in the information unit, unnecessary storage capacity in the information unit can be prevented from increasing.

In addition, a memory residue detecting section, which monitors an amount of a data signal stored in the memory in the FAX section, may be provided to the above arrangement, functions, which controls the FAX section and the information unit and outputs at least one portion of the image information inputted to the FAX section based upon the memory residue detecting section so as to be stored, may be provided to the main control section.

As a result, in the case where the residual storage capacity of the memory is small with respect to received image information, at least one portion of the image information is outputted to the information unit by the memory residue detecting section so as to be stored. Therefore, defective receiving of the received image information can be suppressed and recognized, thereby letting a user know the receiving state more certainly.

In addition, the above arrangement may include an information unit monitor which compares the signal outputted from the information unit with a predetermined reference ID signal. Moreover, when the information unit monitor discriminates that the signal outputted from the information unit coincides with the reference ID signal, the main control section controls the select or switch so that the telephone line is connected to the information unit.

As a result, when the information unit monitor discriminates that the signal outputted from the information unit coincides the reference ID signal, the main control section automatically connects the telephone line to the information unit. Therefore, the connection can be simplified.

Furthermore, the above arrangement may includes:

an information unit monitor for detecting communication history information including a dial number, a communication time, an error state and communication protocol by monitoring the signal inputted to/outputted from the information unit;

a discrimination memory for storing the communication history information in the FAX communication via the telephone line; and a FAX control section for control ling the FAX section so that communication history information relating to the information unit and the communication history information in the FAX communication are stored in the discrimination memory unitedly.

As a result, the information unit monitor monitors a signal inputted/outputted to/from the information unit so as to detect the communication history information, and the discrimination memory stores the communication history information in the FAX communication via the telephone line. Moreover, the FAX control section controls the FAX section so that the communication history information relating to the information unit and the communication history information in the FAX communication are stored unitedly. Namely, since the communication history information relating to the information unit and the communication history information in the FAX communication are managed in the FAX section unitedly, the communication in the information unit can be managed more easily.

In addition, the above arrangement may include a FAX section monitor for monitoring whether the FAX section cannot receive data due to an internal factor. In the above arrangement, the main control section may control the FAX section and the information unit based upon the result detected by the FAX section monitor so that the image information inputted to the FAX section is stored in the information unit.

As a result, in the case where the received image information cannot be outputted as an image due to jam of paper, etc., the main control section outputs and stores the image information to the information unit through the FAX section monitor. As a result, the defective receiving of the received image information can be prevented.

In addition, in order to achieve the above object, a FAX apparatus of the present invention includes:

a selector switch for selectively connecting two of a FAX section, a telephone line and an information unit having a modem which inputs/outputs a data signal including information via the telephone line;

an information unit monitor for monitoring existence or non-existence of a calling-out signal from the information unit and comparing the calling-out signal with a predetermined reference ID signal representing the FAX section; and a main control section for when the information unit monitor discriminates that the calling-out signal coincides with the reference ID signal, controlling the selector switch so that the FAX section is connected to the information unit.

In accordance with the above arrangement, when the FAX section monitor discriminates that the calling-out signal from the information unit coincides with a reference ID signal representing the FAX section, the main control section controls the selector switch so that the FAX section is connected to the information unit. As a result, the image information can be sent from the information unit to the FAX section via the modem.

Accordingly, in the above arrangement, when the FAX section monitor, which discriminates the reference ID signal representing the FAX section, is provided, the image information can be received by the FAX section within the range of the procedure for the normal FAX communication. Namely, the input operation of the calling-out operation may be performed in the FAX section as usual. As a result, it is possible to reduce a burden on software which controls the procedure for receiving in the FAX section at the time of using the FAX section as a printer of the information unit.

The above arrangement includes a mode selection key for directing that the FAX section is connected to the information unit. In the above arrangement, the main control section may control the selector switch based upon the direction inputted to the mode selection key so that the FAX section is connected to the information unit.

As a result, since the FAX section is connected to the information unit by the selector switch, the mode selection key can make the connection simple.

In addition, the above arrangement may include an information unit monitor for comparing the signal outputted from the information unit with the predetermined reference ID signal. In the above arrangement, when the information unit monitor may discriminate that the signal outputted from the information unit coincides with the reference ID signal, the main control section controls the selector switch so that the telephone line is connected to the information unit.

As a result, when the information unit monitor discriminates that the signal outputted from the information unit coincides with the reference ID signal, the main control section automatically connects the telephone line to the information unit, thereby making the connection simple.

Furthermore, the above arrangement includes:

an information unit monitor for detecting communication history information including a dial number, a communication time, an error state and communication protocol by monitoring the signal inputted to/outputted from the information unit;

a discrimination memory for storing the communication history information in the FAX communication via the telephone line; and a FAX control section for controlling the FAX section so that communication history information relating to the information unit and the communication history information in the FAX communication are stored in the discrimination memory unitedly.

As a result, the information unit monitor monitors a signal inputted/outputted to/from the information unit so as to detect the communication history information, and the discrimination memory stores the communication history information in the FAX communication via the telephone line. Moreover, the FAX control section controls the FAX section so that the communication history information relating to the information unit and the communication information unit in the FAX communication are stored unitedly. Namely, since the communication history information relating to the information unit and the communication history information in the FAX communication can be managed in the FAX section unitedly, the communication in the information unit can be managed more easily.

In addition, the above arrangement may include a FAX section monitor for monitoring as to whether the FAX section cannot receive data due to an internal factor. In the above arrangement, the main control section may control the FAX section and the information unit based upon the result detected by the FAX section monitor so that the image information inputted to the FAX section is stored in the information unit.

As a result, in the case where the received image information cannot be outputted as an image due to jam of paper, etc., the main control section outputs and stores the image information to the information unit through the FAX section monitor. As a result, the defective receiving of the received image information can be prevented.

In addition, in order to achieve the above object, a FAX apparatus of the present invention includes:

a selector switch for selectively connecting two of a FAX section having a handset for sending/receiving via a telephone line and a sound modem which modulates/demodulates a sound signal, a telephone line, and an information unit having a modem for inputting/outputting a data signal including a sound signal via the telephone line;

a FAX section monitor for monitoring an output signal outputted from the FAX section so as to discriminate as to whether the output signal is a predetermined reference ID signal representing the information unit; and a main control section for when the FAX section monitor discriminates that the output signal coincides with the reference ID signal, controlling the selector switch so that the handset is connected to the information unit.

In accordance with the above arrangement, when the FAX section monitor discriminates that the output signal from the FAX section coincides with the reference ID signal, the main control section controls the selector switch so that the information unit is connected to the FAX section. As a result, the sound signal from the handset can be inputted to the information unit via a sound modem. Moreover, the sound signal from the information unit can be heard through the handset via the sound modem.

As a result, when the above arrangement is provided with the FAX section monitor, communication of the sound signal between the handset and the information unit becomes possible without requiring a special operation other than the normal transmission operation using the handset. Therefore, the communication between the handset and the information unit can be simplified.

In the above arrangement, the FAX section monitor may be arranged so as to discriminate as to whether the output signal is a hooking signal representing hooking of the handset, and the main control section may be arranged so as to control the selector switch so that the FAX section is connected to the information unit when the FAX section monitor discriminates that the output signal is the hooking signal.

As a result, since the FAX section is connected to the information unit by the hooking signal, the connection can be further simplified.

In addition, in order to achieve the above object, a FAX apparatus of the present invention includes:

a selector switch for selectively connecting two of a FAX section, a telephone line and an information unit having a modem which inputs/outputs a data signal including information via the telephone line;

a discrimination memory for previously storing a predetermined reference ID signal representing the FAX section or the information unit;

a telephone line monitor for analyzing a caller's ID signal inputted from the telephone line in order to input a data signal from the outside and comparing the ID signal inputted from the telephone line with the reference ID signal so as to output coincidence or non-coincidence of the both signals; and a main control section for controlling the selector switch based upon the output from the telephone line monitor so that the telephone line is connected to the FAX section or the information unit.

In accordance with the above arrangement, in order to input the data signal from the outside, a caller's ID signal inputted from the telephone line is analyzed, and the ID signal from the telephone line is compared with the reference ID signal so that coincidence or non-coincidence of two signals is outputted to the telephone line monitor. At this time, the main control section connects the telephone line to the FAX section or the information unit. As a result, the communication between an external unit and the FAX section or the information unit via the telephone line can be simplified further than the conventional manner.

In addition to the procedure for the communication in the normal FAX communication and personal computer communication, the connection by the ID signal becomes possible, thereby making it possible to improve security protection in the information unit and the FAX section.

Further, in order to achieve the above arrangement, a FAX apparatus of the present invention includes:

a selector switch for selectively connecting two of a FAX section, a telephone line and an information unit having a modem which inputs/outputs a data signal including a sound signal via the telephone line;

a FAX section monitor for monitoring input/output of a signal in the FAX section;

a telephone line monitor for monitoring input/output of a signal in the telephone line;

an information unit monitor for monitoring input/output of a signal in the modem; and a main control section for controlling the selector switch based upon the discrimination as to whether a specific signal is detected by at least one of the telephone line monitor and the information unit monitor so that the two of the FAX section, the telephone line and the information unit relating to the specific signal are connected.

In accordance with the above arrangement, a main control section selects the two of the FAX section, the telephone line and the information unit relating to the specific signal based upon the discrimination as to whether a specific signal is detected by at least one of the FAX section monitor, the telephone line monitor and the information unit monitor. Then, since the FAX section and the information unit, for example, are connected automatically, the FAX section can be immediately utilized as a scanner/printer for the information unit. Namely, even if a new operation other than the normal operation of the FAX communication is not added, the data communication between the FAX section and the information unit can be executed.

In the FAX section monitor, examples of the specific signals are receiver's code number and ID number, and ID signals such as connecting signals representing a specified dial number.

In addition, in the telephone line monitor, examples of the specific signals are a connecting signal and ID signal for the FAX communication and PC communication via the telephone line.

Further, in the information unit monitor, examples of the specific signals are an ID signal and calling-out signal representing a receiver's dial number, and a data signal representing communication history between the information unit and the outside.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

For a fuller understanding of the nature and advantages of the invention, reference should be made to the ensuing detailed description taken in conjunction with the accompanying drawings.

BRIEF DESCRIPTION OF THE DRAWINGS

FIG. 3 is a plan view of an operation panel of the FAX apparatus.

FIG. 5(a) is an explanatory drawing which shows a data structure in normal FAX communication; and FIG. 5(b) is an explanatory drawing which shows a data structure in data communication with the information unit.

FIG. 6 is a flow chart which shows another example of the operation in the FAX apparatus.

DETAILED DESCRIPTION OF THE PREFERRED EMBODIMENTS

The following describes one embodiment of a FAX apparatus of the present invention on reference to FIGS. 1 through 10.

Figure 1:
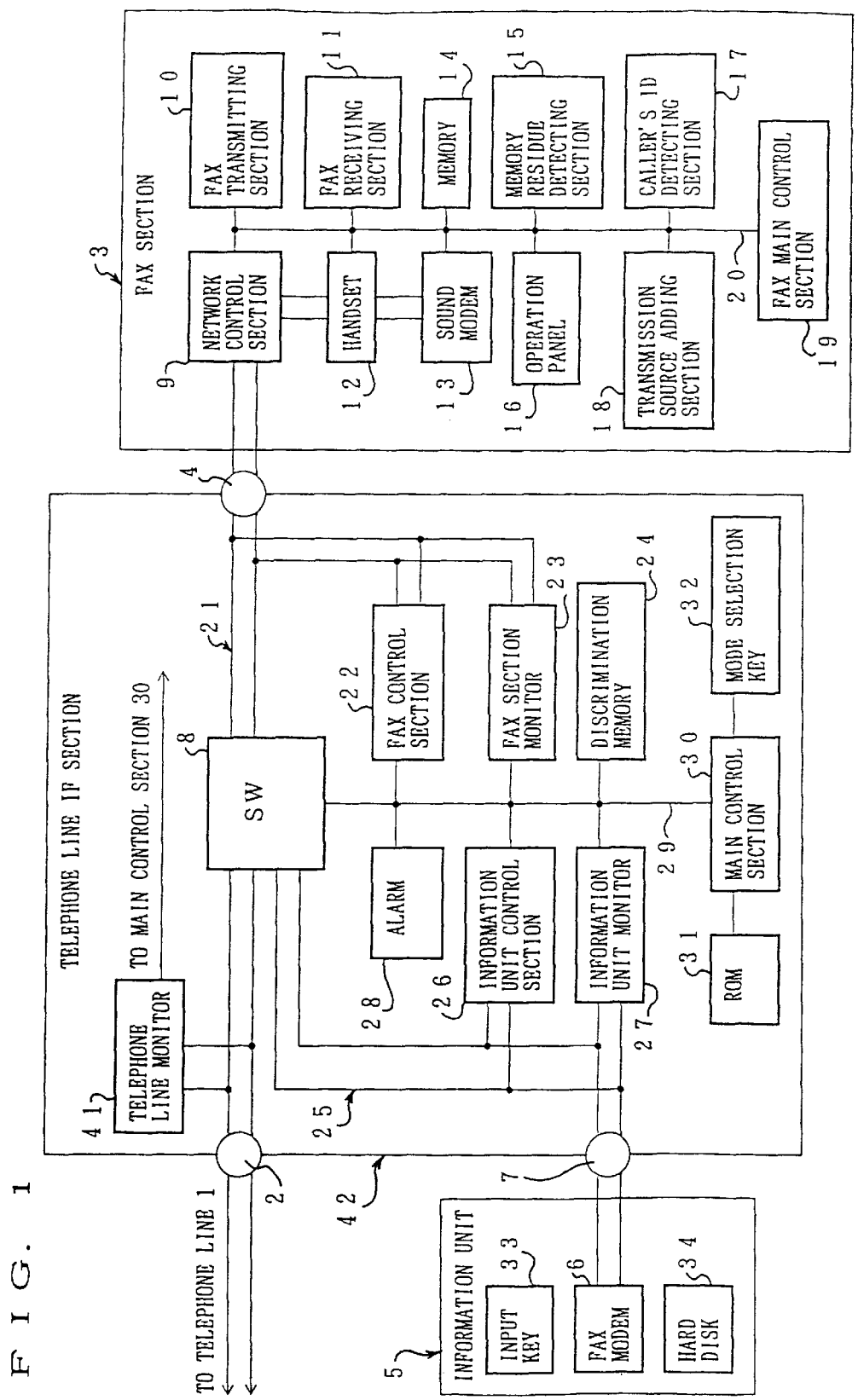
FIG. 1 is a block diagram which shows a FAX apparatus of the present invention, a telephone line connected to the FAX apparatus and an information unit.
Figure 2:
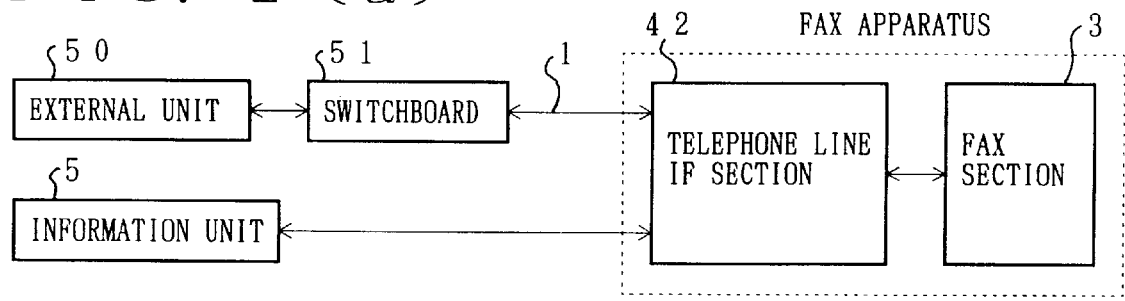
FIG. 2(a) is a block diagram which shows a connecting relationship among the FAX apparatus, an external unit to be connected to the FAX apparatus and the information unit via the telephone line.
FIG. 2(b) is a block diagram which shows a connecting relationship between the external unit and the FAX apparatus.
FIG. 2(c) is a block diagram which shows a connecting relationship between the external unit and the information unit via the FAX apparatus.
FIG. 2(d) is a block diagram which shows a connecting relationship between the information unit and the FAX apparatus.
Figure 2:
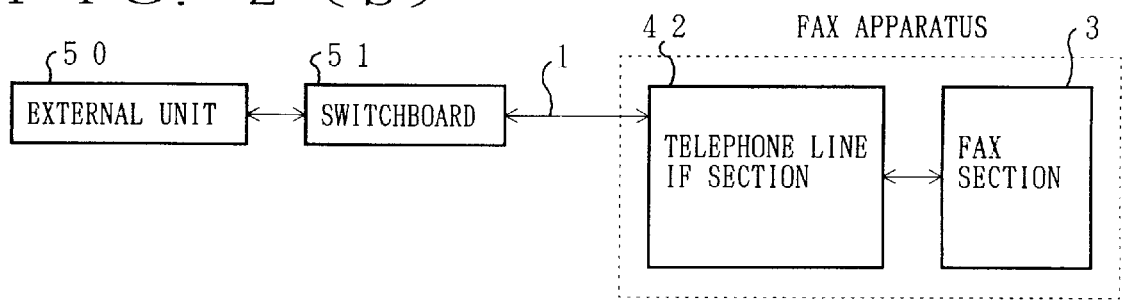
Figure 2:
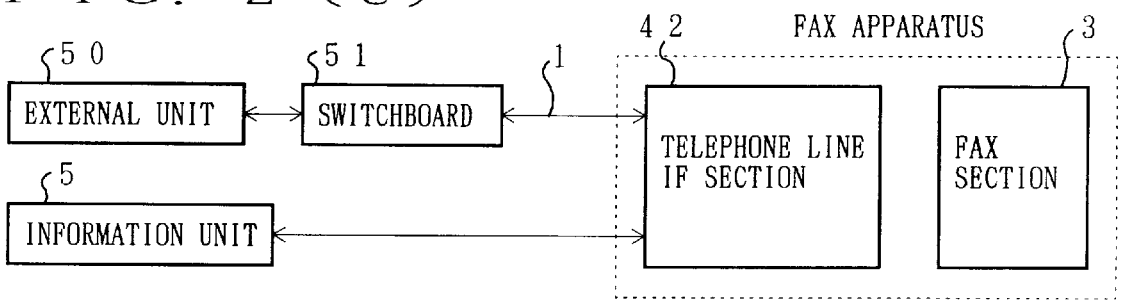
Figure 2:
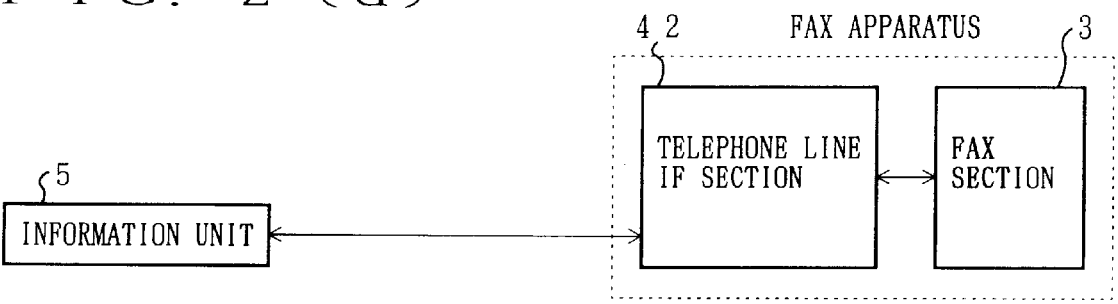

As shown in FIGS. 1 and 2(a), the FAX apparatus of the present invention has a FAX section 3, a telephone line interface section 42 (i.e., telephone line IF section 42). The telephone line IF section 42 selectively connects the FAX section 3 to an information unit 5 such as PC with a modem (FAX modem) 6 or to a telephone line 1. An external unit 50 such as an external PC and FAX apparatus is connected to the telephone line 1 via a switchboard 51.

In addition, the telephone line IF section 42 has a telephone terminal 2 to be connected to the telephone line 1, a FAX terminal 4 to be connected to the FAX section 3, and an information unit terminal 7 to be connected to the FAX modem 6 of the information unit 5.

Furthermore, in the telephone line IF section 42, a selector switch (i.e., selector SW) 8 is provided so as to selectively connect two of the three terminals 2, 4 and 7. The selector SW 8 is switching means which is connected to the telephone terminal 2, the FAX terminal 4 and the information unit terminal 7. The selector SW 8 is set so as to connect the telephone terminal 2 to the FAX terminal 4 in a waiting state.

The FAX modem 6 has a modulating/demodulating function in digitizing and analog-modulating a data signal such as image information and sound information, a data compressing function, and a data transmitting function with the telephone line 1. The FAX modem 6 satisfies, for example, the restriction of Class 1 or Class 2 of EIA (Electronic Industries Association).

The following describes each arrangement of the FAX section 3. The FAX section 3 is provided with a network control section 9 and a FAX transmitting section 10. The network control section 9 controls data transmission with external lines such as the telephone line 1 which inputs/outputs a data signal such as image information. The FAX transmitting section 10 scans a document by an LED (Light Emitting Diode) array or the like and converts image information of the document into digital image information so as to output the digital image information to the network control section 9. The FAX transmitting section 10 is provided with a document detecting section (not shown) which, for example, optically or mechanically detects as to whether or not a document is set on a document platen.

In addition, the FAX section 3 is provided with a FAX receiving section 11 which prints out a document according to digital image information to be inputted from the network control section 9 by scanning using a thermal printer or the like. The FAX receiving section 11 is provided with a receiving state detecting section (not shown) which detects whether receiving is impossible due to a jam of transfer paper on which an image is to be printed, etc.

The network control section 9 generates dial pulses according to dial numbers and DTMF (Dual-Tone Multi Frequency) signals obtained by combining two signals with different frequencies so as to send a receiver's dial number. For example, in the case of No. "5", the network control section 9 generates a signal obtained by combining a signal of 1,336 Hz and a signal of 770 Hz.

Furthermore, the FAX section 3 is provided with a handset 12 which communicates as a normal telephone so as to send and receive an analog sound signal representing a sound to and from the network control section 9. The handset 12 is provided with a (mechanical) hook switch (not shown) which mechanically detects an on-hook state or an off-hook state of the handset 12. Instead of a hooking switch (hooking button), mentioned later, the aforementioned hook switch may repeat an on/off operation a plurality of times for a predetermined interval, for one sec., for example.

In addition, the FAX section 3 is provided with a sound modem 13 as a sound modem which exchanges sound data with the information unit 5 by means of the handset 12. The sound modem 13 sends and receives an analog sound signal to and from the handset 12, and modulates the analog sound signal to a digital sound signal and demodulates the digital sound signal to the analog sound signal so as to send and receive the digital sound signal to and from the network control section 9.

The FAX section 3 is provided with a memory 14 such as RAM (Random Access Memory), which temporarily stores digital image information from the FAX transmitting section 10 and temporarily stores digital image information from the network control section 9 so as to give them to the FAX receiving section 11, and provided with a memory residue detecting section 15, which monitors residual storage capacity of the memory 14 so as to detect residual capacity of the memory. The memory 14 also stores communication history, such as receiver's telephone number, name, receiving time, and sending time from a sender.

An operation panel 16 is provided to an outer surface of the FAX apparatus. As shown in FIG. 3, the operation panel 16 is provided with a push button 36 including a ten key for inputting a receiver's dial number and designating start of FAX communication to a receiver. With the push button 36, simplified dialing is possible.

In addition, the operation panel 16 is provided with a mode selection key 32 which makes a selection from various modes (FAX, telephone, answering machine and PC), and a mode display section 38 which shows that one mode is selected from the various modes.

Further, the operation panel 16 is also provided with a hooking button (not shown), a start key (start switch) 39 and a stop key 44. The hooking button temporarily holds a communication line received from the telephone line 1 for call-waiting and switches to another communication line. The start key 39 designates the start of FAX communication from the FAX section 3. The stop key 44 designates the stop of FAX communication, etc. Moreover, the operation panel 16 is provided with an LCD display section 40 which displays a telephone number and name of a receiver.

Furthermore, as shown in FIG. 1, the FAX section 3 includes a caller's ID detecting section 17. Here, one who sends a signal is called as a caller. The caller's ID detecting section 17 detects an ID signal as a code number which is caller's ID information transmitted from a caller so as to transmit a document set on the FAX transmitting section 10 to a receiver automatically, safely and accurately by transmission instruction from the caller.

Further, the FAX section 3 is provided with a transmission source adding section 18 and a FAX main control section 19. The transmission source adding section 18 adds data signals representing a sender's telephone number and number to a head section, for example, on each page when image information is sent out per page. The FAX main control section 19 controls members 9 through 18 via a bus line 20. Namely, the FAX main control section 19 monitors states of each function of the members 9 through 18, more specifically, for example, monitors the jamming of transfer paper in the FAX receiving section 11 and existence or non-existence of transfer paper.

The following further details the telephone line IF section 42. In the telephone line IF section 42, a FAX control section 22 is connected to a telephone line 21 between the FAX terminal 4 and the selector SW 8. The FAX control section 22 stops the operation of the transmission source adding section 18 as the need arises, generates a dummy DC loop current which is similar to a DC loop current in the telephone line 1 so as to send out it to the telephone line 21, and combines a communication history of the information unit 5 with the outside via the telephone line 21 with communication history in the FAX section 3 unitedly so as to sent the combined communication history to the memory 14.

In addition, a FAX section monitor (FAX section detecting means, FAX section monitor means and receiving monitor means) 23, which is connected to the telephone line 21, monitors a data signal which is inputted/outputted from/to the FAX section 3 via the FAX terminal 4. Moreover, the FAX section monitor 23 monitors temporary breakdown of the DC loop current based upon the operation of the hooking button and the hook switch.

A discrimination memory (storage section) 24, which stores a predetermined reference data signal and reference ID signal, is provided to the telephone line IF section 42 so as to discriminate ID signals such as a sender's or receiver's code number and ID number included in the data signal by comparison.

Examples of the ID signals are a dial number representing the FAX section 3 which is inputted from the outside into the FAX section 3, a signal representing the aforementioned DTMF signal and dial pulse signal, and a connecting signal for starting PC communication for the information unit 5.

Furthermore, examples of the ID signals are a signal representing jam and insufficient transfer paper, a signal representing insufficient residual capacity of a memory detected by the memory residue detecting section 15, and a connecting signal representing a specified dial number to be outputted from the FAX section 3 for data communication with the information unit 5, for example, a dial number "5#".

Furthermore, in the telephone line IF section 42, an information unit control section 26 is connected to a telephone line 25 between the information unit terminal 7 and the selector SW 8. The information unit control section 26 generates a dummy DC loop current which is similar to the DC loop current of the telephone line 1, and a dial number for starting the FAX modem 6 in the information unit 5 so as to send them to the telephone line 25.

In addition, an information unit monitor (monitor means, monitor section, analyzing means) 27 is connected to the telephone line 25. The information unit monitor 27 monitors an ID signal and a calling-out signal representing a receiver's dial number, which are sent from the information unit 5 to the outside via the information unit terminal 7, and monitors a data signal representing communication history of the information unit 5 with the outside, for example, with the FAX section 3. A reference ID signal for discriminating as to whether or not the receiver's dial number shows the FAX section 3 is previously stored in the discrimination memory 24.

Further, in the telephone line IF section 42, a telephone line monitor (telephone line detecting means, telephone line analyzing means, comparison means) 41 is connected to a telephone line between the telephone terminal 2 and the selector SW 8. The telephone line monitor 41 always detects and monitors a connecting signal and an ID signal for FAX communication and PC communication from the telephone line 1.

Since the telephone line monitor 41, the information unit monitor 27, the information unit control section 26 and the FAX control section 22 are provided, like the conventional manner, the transmission of data signals between the information unit 5 and the FAX section 3 can be performed directly via one telephone line 1 without using respective telephone lines 1, namely, two telephone lines 1.

The telephone line IF section 42 is provided with an alarm 28 which alerts a user to bad condition by a sound when the data communication between the FAX section 3 and the information unit 5 is in a bad condition.

The telephone line IF section 42 includes a main control section (control means, comparison means) 30 and a ROM (Read Only Memory) 31. The main control section 30 controls the members 8, 22 through 24 and 26 through 28 via a bus line 29. The ROM 31 stores programs representing procedure for the operation of the main control section 30.

In addition, in the telephone line IF section 42, the mode selection key 32 is connected to the main control section 30, and, not shown in FIG. 1, the mode display section 38 is also connected to the main control section 30. As shown in FIG. 3, the mode selection key 32 transmits a manual instruction by key operation via a user to the main control section 30 so as to switch the modes in the FAX apparatus of the present invention. The mode display section 38 is selected by the mode selection key 32 and displays a mode set in the main control section 30 by turning on a lamp.

Figure 4:
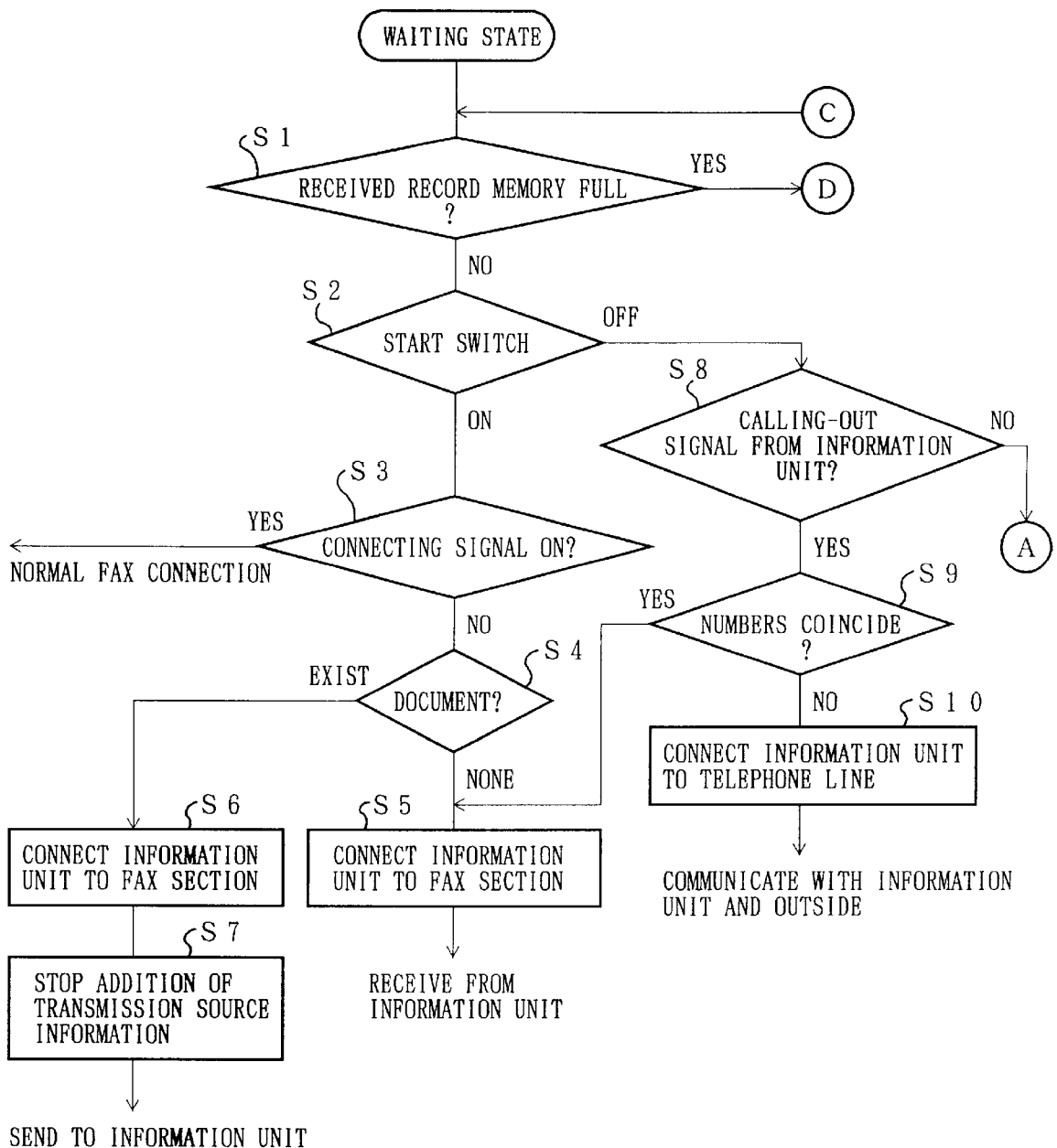
FIG. 4 is a flow chart which shows an example of an operation in the FAX apparatus.

The following describes examples of each operation of the above embodiments. First, a description is given as to the case of automatic sending and receiving in the FAX apparatus. As shown in FIG. 4, the main control section 30 always judges whether the memory 14 which is also a received record memory is full, namely, the memory 14 has no residual capacity, or the memory 14 is in an insufficient state, by the residual capacity of the memory detecting section 15 (monitor means) in the FAX section 3 when the main control section 30 is in a waiting state (step 1, i.e. S1). When the memory 14 is in the full state (YES), the sequence goes to a subroutine D, mentioned later, and when NO, the sequence goes to S2.

At S2, the main control section 30 controls the FAX section monitor 23 via the FAX control section 22. Namely, the FAX section monitor 23 detects the ON/OFF state of the start key 39 on the operation panel 16 of the FAX section 3 (S2). When the start key 39 is turned on, the main control section 30 successively judges whether or not the telephone line monitor 41 receives a connecting signal for FAX communication or PC communication from the external telephone line 1 (S3). When the telephone line monitor 41 receives the connecting signal, as shown in FIG. 2(b), the main control section 30 controls the selector SW 8 so that the telephone line 1 is connected to the FAX section 3, that is normal FAX connection.

Meanwhile, when the connecting signal is not received by the telephone line monitor 41, the main control section 30 successively judges as to whether a document is set in the FAX transmitting section 10 (S4). When a document is not set in the FAX transmitting section 10, as shown in FIG. 2(d), the information unit 5 is connected to the FAX section 3 by the selector SW 8, and the main control section 30 judges that data such as image information can be received from the information unit 5 (S5).

At this time, in the FAX apparatus, the image data signal from the information unit 5 shown in FIG. 5(a), is received by the FAX receiving section 11 via the information unit terminal 7, the telephone line 25, the selector SW 8, the telephone line 21 and the FAX terminal 4. The PC/FAX function of the information unit 5 is set to a sending mode by operation of an input key 33 of the information unit 5. In the FAX apparatus, the FAX receiving section 11 can be used as a printer of the information unit 5 by inputting an ID number of the FAX section 3 such as a receiver's dial number via the input key 33.

On the contrary, when a document is set in the FAX transmitting section 10, the main control section 30 connects the information unit 5 to the FAX section 3 via the selector SW 8 and judges that data such as image information can be sent to the information unit 5 (S6). Thereafter, the main control section 30 controls the transmission source adding section 18 via the FAX control section 22 so as to stop addition of an information signal representing a transmission source in normal FAX communication shown in FIG. 5(a) (S7). Further, the main control section 30 allows data shown in FIG. 5(b) such as image information, from which a transmission source information is excluded, to be outputted from the FAX section 3.

At this time, the data such as image information is sent from the FAX transmitting section 10 to the information unit 5 via the FAX terminal 4, the telephone line 21, the selector SW 8, the telephone line 25 and the information unit terminal 7. In the FAX apparatus, when the data such as image information is sent from the FAX transmitting section 10 to the information unit 5, the FAX transmitting section 10 can be used as a scanner of the information unit 5.

In addition, when the start key 39 is off at S2, the information unit monitor 27 monitors existence or non-existence of a signal in the telephone line 25, and the main control section 30 judges as to whether the signal is a calling-out signal from the information unit 5 to the outside (S8). Then, the main control section 30 judges as to whether the calling-out signal represents a reference ID signal showing the FAX section 3, for example, previously stored in the discrimination memory 24, i.e., a FAX number. Namely, the main control section 30 judges as to whether the calling-out signal coincides with the reference ID signal (S9).

When the calling-out signal coincides with the reference ID signal at S9, the sequence goes to S5. Meanwhile, when the calling-out signal does not coincide with the reference ID signal, as shown in FIG. 2(c), the main control section 30 control the selector SW 8 so that the information unit 5 is connected to the telephone line 1 (S10). In such a manner, the information unit 5 can be used for PC communication via the telephone line 1. Moreover, also in the case where the signal detected at S9 is a connecting signal for connection with the telephone line 1 for PC communication, the main control section 30 controls the selector SW 8 so that the information unit 5 is connected to the telephone line 1. When the calling-out signal is not detected from the information unit 5 at S8, the sequence goes to a subroutine A, mentioned later.

The following describes the subroutine D which is an example of the operation when the received record memory is full at S1. As shown in FIG. 6, when the received record memory is full, the main control section 30 controls the selector SW 8 at first so that the FAX section 3 is connected to the information unit 5 (S11). Then, the data in the received record memory 14 are sent to the information unit 5, and are recorded to a hard disk 34 which is a large capacity recording medium in the information unit 5 via the information unit control section 26. The FAX apparatus can suppress defective receiving of the data and confirms the defective receiving accurately.

The following describes the subroutine A in the case where the signal is not detected at S8 by monitoring existence or non-existence of signals in the telephone line 25 by the information unit 27, namely, the signal is not a calling-out signal from the information unit 5 to the outside.

Figure 7:
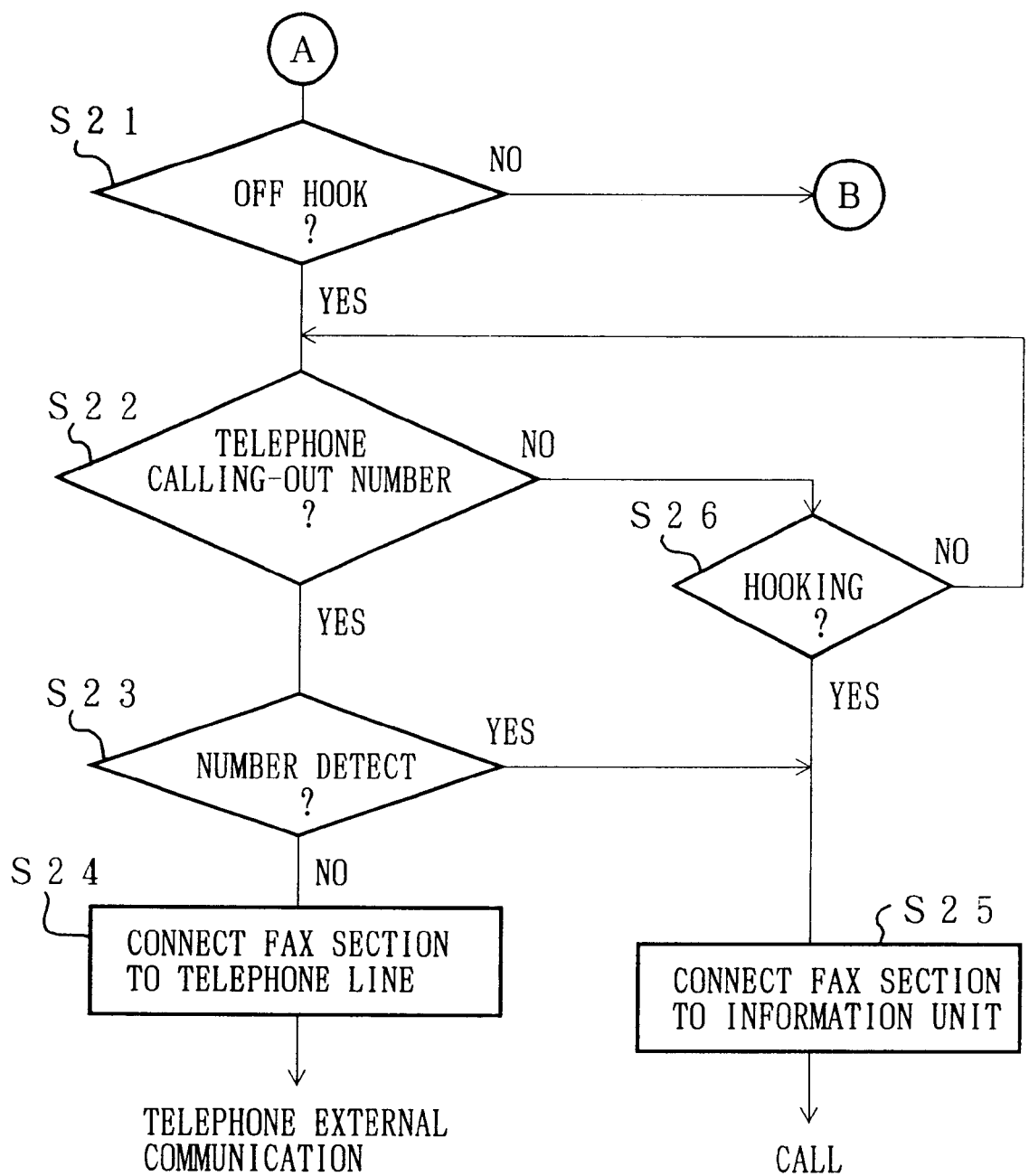
FIG. 7 is a flow chart which shows still another example of the operation in the FAX apparatus.

First, as shown in FIG. 7, when the signal is not detected as mentioned above, the main control section 30 judges whether the handset 12 (handset) is held by a hook switch provided to the handset 12 by means of the FAX section monitor 23 (S21). When the handset 12 is not held, the sequence goes to a subroutine B, mentioned later, and when the handset 12 is held, the main control section 30 detects by means of the FAX section monitor 23 as to whether a telephone calling-out number is outputted from the FAX section 3 to the telephone line 21 via the FAX terminal 4 by the push button 36 on the operation panel 16 (S22).

Thereafter, when a telephone calling-out number is detected at S22, the telephone calling-out number is compared with the reference ID signal representing the information unit 5 previously stored in the discrimination memory 24 such as an ID number representing the information unit 5 and an ID number for PC communication (S23). When the telephone calling-out number is different from the ID number representing the information unit 5, as shown in FIG. 2(b), the main control section 30 controls the selector SW 8 so that the FAX section 3 is connected to the telephone line 1 (S24). At this time, in the FAX apparatus of the present invention, external telephone communication, i.e., communication with the outside, can be executed by the handset 12 via the telephone line 1.

Meanwhile, when the telephone calling-out number coincides with the ID number representing the information unit 5, as shown in FIG. 2(d), the main control section 30 controls the selector SW 8 so that the FAX section 3 is connected to the information unit 5 (S25).

At this time, in the FAX apparatus of the present invention, when the push button 36 on the operation panel 16, for example, is operated, the communication with the information unit 5 can be executed by the handset 12 via the telephone line IF section 42. Namely, in the FAX apparatus of the present invention, a sound signal as a sound file from the handset 12 can be stored in the information unit 5 via the sound modem 13 as a sound modem, and the sound file such as the sound signal stored in the information unit 5 can be heard through the handset 12.

Furthermore, at this time, the main control section 30 generates a dummy DC loop current from the information unit control section 26 to the FAX modem 6 as a modulator-demodulator via the telephone line 25. The dummy DC loop current represents starting of data communication in the FAX modem 6. Then, the main control section 30 controls the information unit control section 26 so that the control signal, which represents that the data signal representing a sound signal is sent from the FAX section 3 to the information unit 5, is outputted to the information unit 5 via the telephone line 25.

In addition, when a telephone calling-out number is not outputted from the FAX section 3 at S22, the main control section 30 discriminates through the FAX section monitor 23 as to whether the telephone line is temporarily hooked (the hooking button is turned ON) (S26). Namely, the main control section 30 discriminates whether the output signal from the FAX section 3 is a hooking signal representing that the handset is hooked. When the handset is not hooked, the sequence returns to S22, and when the handset is hooked, the sequence goes to S25.

In order to detect the off-hooking state, the following two methods are used. The first one is a method for detecting a DC loop current, which flows through the telephone line 21 due to the on-off operation of the hook switch when the handset 12 is picked up, by the telephone line monitor 41.

The second one is a method for detecting a signal representing a dial number by the FAX section monitor 23 or the telephone line monitor 41 at the same time of the detection of the DC loop current when after the simplified dialing is executed by the push button 36, the start key 39 is operated, or a method for detecting a dial tone (DT) representing completion of preparation for receiving from a telephone switchboard, such as a continuous wave of 400 Hz, by the telephone line monitor 41 at the same time of the detection of the DC loop current.

Figure 8:
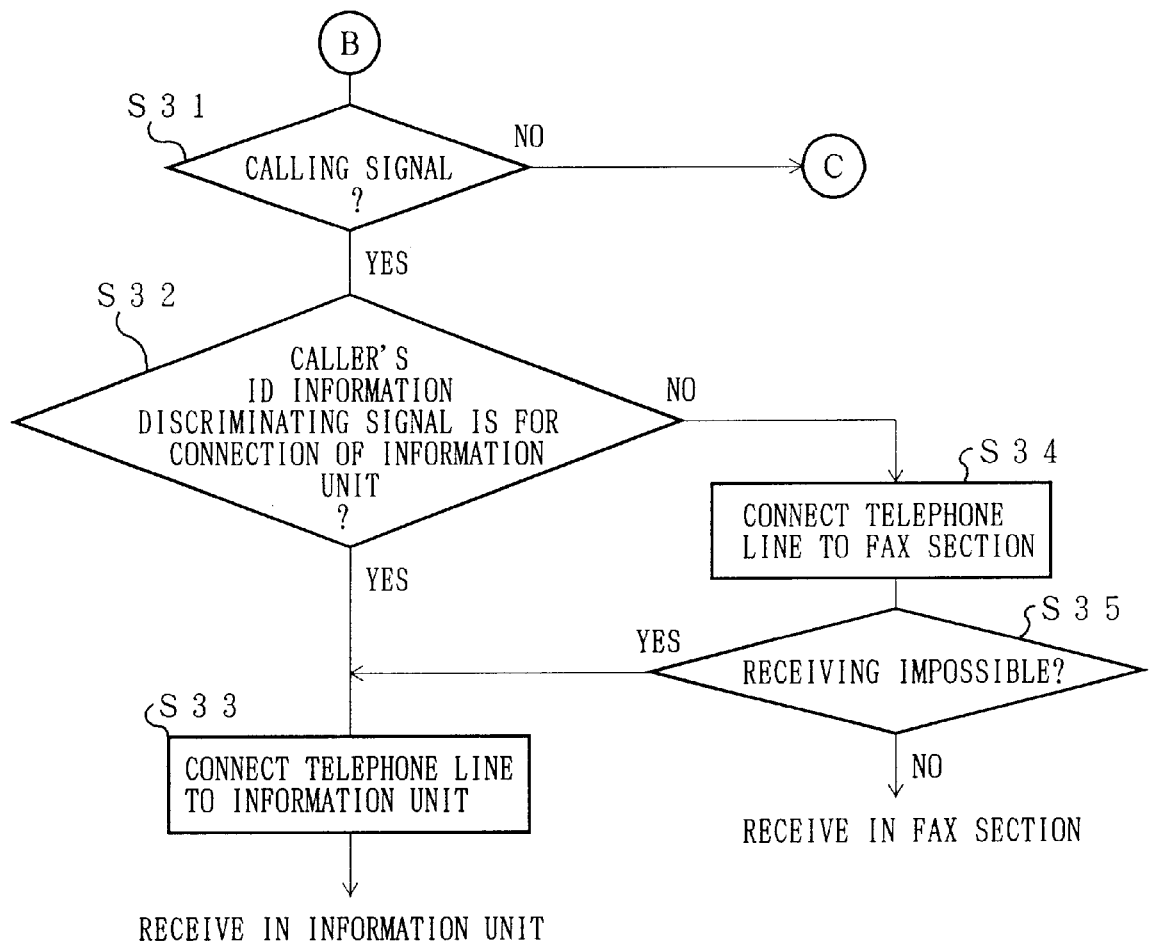
FIG. 8 is a flow chart which shows still another example of the operation in the FAX apparatus.
Figure 9:
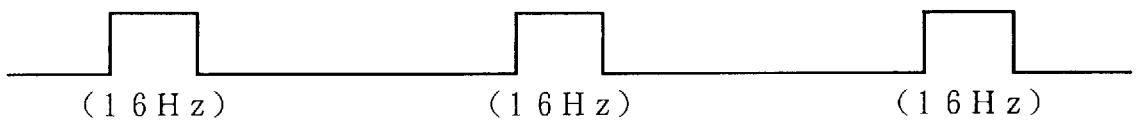
FIG. 9(a) is an explanatory drawing which shows a normal calling-out signal on the telephone line in the FAX apparatus.
FIG. 9(b) is an explanatory drawing which shows a calling-out signal including an ID signal such as sender's ID information in the FAX apparatus.
Figure 9:
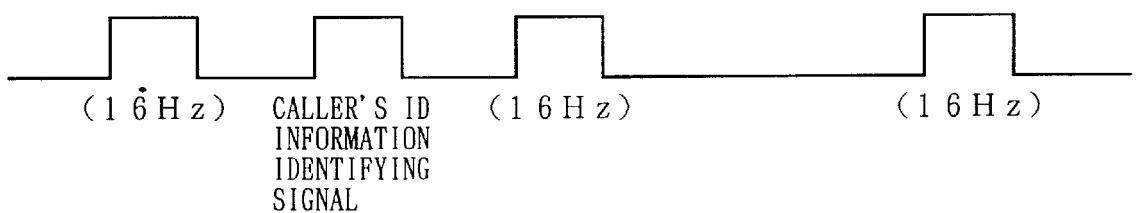

The following describes an example of the operation in the subroutine B. As shown in FIG. 8, a discrimination is made as to whether a calling-out signal shown in FIG. 9(a) (the following is repeated: a signal of about 16 Hz is on for about one second, and then is off for two seconds) is detected from the telephone line 1 by the telephone line monitor 41 (S31). When the calling-out signal is not detected, the sequence goes to a subroutine C, i.e. S1. Meanwhile, when the calling-out signal is detected, the main control section 30 judges as to whether the calling-out signal includes the ID signal such as caller's ID information as shown in FIG. 9(b).

Then, the main control section 30 judges as to whether the detected ID signal is a connecting signal for connection with the information unit 5 (S32). When the ID signal is the connecting signal for connection with the information unit 5, the telephone line 1 is connected to the information unit 5 (S33).

At this time, in the FAX apparatus, data which is image information from the outside can be received by the information unit 5 via the telephone line 1, the telephone terminal 2, the selector SW 8, the telephone line 25 and the information unit terminal 7.

In addition, when the detected ID signal is a connecting signal for connection with the FAX section 3 for FAX communication at S32, or when the ID signal is not included in the calling-out signal, the main control section 30 connects the telephone line 1 to the FAX section 3 via the selector SW 8 (S34).

Then, the main control section 30 monitors the FAX section 3 via the FAX section monitor 23 so as to discriminates as to whether the FAX section 3 is in receiving impossible state (for example, jam in the FAX receiving section 11, etc.) (S35). When the FAX section 3 is in the receiving impossible state, the sequence goes to S33, data sent to the FAX section 3 from the outside via the telephone line 1 is transmitted to the information unit 5, and thus the information unit 5 can receive the data.

In addition, when the FAX section 3 can receive data at S35, data such as image information from the outside can be received by the FAX receiving section 11 via the telephone line 1, the telephone terminal 2, the selector SW 8, the telephone line 21 and the FAX terminal 4 in the FAX apparatus.

Figure 10:
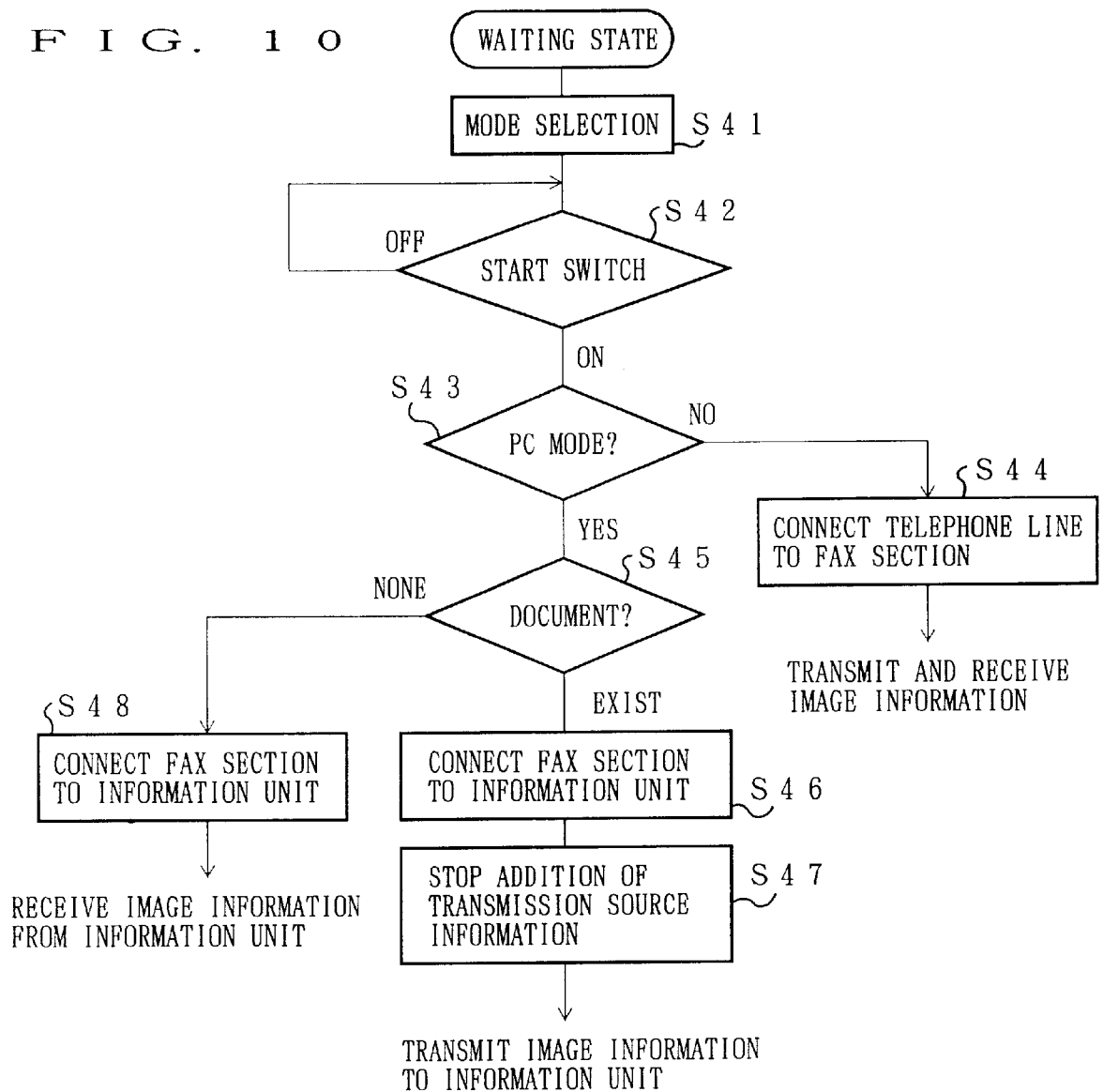
FIG. 10 is a flow chart which shows still another example of the operation in the FAX apparatus.

The following describes the case of manual sending and receiving. As shown in FIG. 10, selection is made from various modes (fax, telephone, answering machine, PC) shown on the mode display section 38 by the mode selection key 32 on the operation panel 16 (S41). Next, the FAX section monitor 23 discriminates whether the start key 39 is turned on (the start key on the operation panel 16 is pressed down) (S42). When the start key 39 is turned off, the sequence returns to S42.

Meanwhile, when the start key 39 is turned on, the main control section 30 discriminates as to whether the PC mode is selected (S43). When the PC mode is not selected (NO), as mentioned above, the main control section 30 connects the telephone line 1 to the FAX section 3 (S44). Then, the data such as image information can be sent and received from or to the outside in the FAX section 3 via the telephone line 1.

In addition, when the PC mode is selected (YES), as mentioned above, the main control section 30 discriminates as to whether a document is set in the FAX transmitting section 10 (S45). When a document is set, the main control section 30 connects the FAX section 3 to the information unit 5 (S46). Then, the main control section 30 controls the transmission source adding section 18 of the FAX section 3 so that the addition of transmission source information to the image information from the FAX transmitting section 10 is stopped (S47), and the data such as image information from the FAX section 3 are sent to the information unit 5.

Meanwhile, when a document is not set at S45, the main control section 30 connects the FAX section 3 to the information unit 5 (S48), and the data such as image information from the information unit 5 are outputted to the FAX section 3.

Furthermore, at the time of the data communication to the outside from the information unit 5, the main control section 30 allows the memory 14 to store the data signal monitored by the information unit monitor 27 connected to the telephone line 25 via the FAX control section 22. At this time, the main control section 30 controls the FAX main control section 19 so that the communication history information in the FAX transmitting section 10 and the FAX receiving section 11 in the FAX section 3 is stored in the memory 14 together with the data signal and is unitedly managed. The data signal shows a dial number, communication time, communication protocol, and communication error state.

In the case of the data communication of image information, the communication time is a time required for receiving a called station ID signal (CED signal) in the FAX communication and receiving of a disconnect signal (DCN signal), and the communication time is monitored by the network control section 9 or the telephone line monitor 41 so as to be measured. Moreover, in the case of data communication with a sound signal, the communication time is a time required for sending and receiving the sound signal and judging the completion of the data communication due to suspension of the data signal for a predetermined time, and the communication time is monitored by the network control section 9 or the telephone line monitor 41 so as to be measured.

In addition, the main control section 30 compresses the data signal, which is stored in the memory 14 so that the image is reproduced in the FAX receiving section 11, in, for example, the network control section 9. Then, as mentioned above, when the FAX section 3 is connected to the information unit 5 by the selector SW 8, a received file of the image information stored in the memory 14 can be stored in the hard disk 34, for example, of the information unit 5 periodically.

In accordance with the arrangement of the above embodiment, the FAX transmitting section 10 and the FAX receiving section 11 can be connected to the information unit 5 via the FAX modem 6 by the selector SW 8. As a result, the FAX transmitting section 10 and the FAX receiving section 11 are used for normal FAX communication, and can be also used as a scanner or a printer of the information unit 5.

In addition, in the above arrangement, the FAX section 3 having telephone and FAX functions can be connected to the information unit 5 having the FAX modem 6 by means of one telephone line 1. Moreover, in the above arrangement, selection can be automatically made from the data communication, FAX receiving and answering machine between the FAX section 3 and the information unit 5 by the ID signal of a receiver's ID number.

Document transmission from the information unit 5 is advantageous to quality of an image and comparison with reading from the FAX receiving section 10 as a scanner, and thus a prepared document can be directly sent. On the contrary, the FAX receiving in the information unit 5 requires that the power of the information unit 5 should be always turned on, and requires a large capacity of memory, thereby arising a problem.

However, in accordance with the above arrangement, since the sending in the same line can be executed mainly from the information unit 5, and the receiving can be executed in the FAX receiving section 11 of the FAX section 3, the above problem can be avoided.

On the contrary, in the case where an unexpected accident occurs, namely, in the case where the FAX receiving section 11 cannot receive data signal, or where a residual capacity of the memory 14 as a receiving memory is detected as zero or insufficient, the information unit 5 is automatically selected so that a received data signal such as image information is received by the information unit 5. Next, the data signal can be stored in the hard disk 34, for example, and the communication record is retained in the memory 14 of the FAX section 3. As a result, united management can be executed.

Accordingly, in the above arrangement, defective receiving of the data signal such as image information and a sound signal generated due to the unexpected accident can be prevented. Moreover, a user can recognize the unexpected accident easily.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A facsimile apparatus comprising:
   switching means for selectively connecting two of a facsimile section, a telephone line and an information unit having a modem which inputs/outputs a data signal including information via the telephone line;
   a facsimile section monitor for monitoring input/output of a signal in the facsimile section;
   a telephone line monitor for monitoring input/output of a signal in the telephone line;
   an information unit monitor for monitoring input/output of a signal in the modem;
   a monitor section for detecting communication history information, including at least one of a dial number, a communication time, an error state and communication protocol, by monitoring signals inputted to/outputted from the information unit;
   a memory for storing communication history information relating to facsimile communication via the telephone line;
   a facsimile control section for controlling the facsimile section so that the communication history information relating to the information unit and the communication history information relating to the facsimile communication are stored in the memory in a united manner;

a discrimination memory for storing predetermined reference identification signals; and control means for controlling said switching means such that when a specific signal is detected by at least one of said facsimile section monitor, said telephone line monitor and said information unit monitor, one of the predetermined reference identification signals related to the detection of the specific signal is compared with the specific signal, and two of said facsimile section, said telephone line and said information unit having the modem are selectively connected to each other according to whether or not the specific signal coincides with said related one of the predetermined reference identification signals.

2. The facsimile apparatus according to claim 1, wherein said facsimile section includes a start switch which directs said facsimile section to be operated, said facsimile section monitor detects an ON/OFF state of the start switch, said telephone line monitor detects existence or non-existence of a connecting signal when said facsimile section is externally connected via the telephone line, and when the ON operation of the start switch is detected by said facsimile section monitor and the connecting signal is not detected by said telephone line monitor, said control means controls said switching means to connect said facsimile section to said information unit.

3. The facsimile apparatus according to claim 2, further comprising a facsimile control section for when the facsimile section is connected to the information unit via said switching means, allowing the facsimile section to stop addition of an information signal representing a transmission source to image information from the facsimile section.

4. The facsimile apparatus according to claim 2, further comprising:

monitor means for monitoring residual storage capacity of a memory provided to the facsimile section, wherein said control means controls the facsimile section and the information unit so that at least one portion of the image information inputted to the facsimile section is inputted and stored to the information unit according to the residual storage capacity detected by said monitor means.

5. The facsimile apparatus according to claim 2, wherein said related one of the reference identification signals is a specific reference identification signal representing a connecting signal for connection with the telephone line, and when said information unit monitor discriminates that the signal outputted from the information unit coincides with the specific reference identification signal, said control means controls said switching means to connect the telephone line to the information unit.

6. The facsimile apparatus according to claim 2, wherein said facsimile section monitor functions as a receiving monitor for monitoring whether or not the facsimile section cannot receive data due to an internal factor, and when said start switch is in an OFF state, said control means controls the facsimile section and the information unit based upon the result detected by said receiving monitor so that the image information inputted to the facsimile section via the telephone line is stored in the information unit.

7. The facsimile apparatus according to claim 1, wherein the specific signal is a calling-out signal from the information unit, said related one of the reference identification signals is a first specific reference identification signal representing the facsimile section, and when said information unit monitor discriminates that the calling-out signal coincides with the first specific reference identification signal representing the facsimile section, said control means controls said switching means to connect the facsimile section to the information unit.

8. The facsimile apparatus according to claim 7, further comprising:

input means for directing connection of the facsimile section and the information unit, wherein said control means controls said switching means based upon the direction inputted by said input means to connect the facsimile section to the information unit.

9. The facsimile apparatus according to claim 7, wherein when said information unit monitor detects that the calling-out signal does not coincide with the first specific reference identification signal, said control means controls said switching means to connect the telephone line to the information unit.

10. The facsimile apparatus according to claim 7, wherein said related one of the reference identification signals is a second specific reference identification signal representing a connecting signal for connection with the telephone line, and when said information unit monitor discriminates that the calling-out signal coincides with the second specific reference identification signal, said control means controls said switching means to connect the telephone line to the information unit.

11. The facsimile apparatus according to claim 7, further comprising:

a monitor section for detecting communication history information including a dial number, a communication time, an error state and communication protocol by monitoring the signal inputted to/outputted from the information unit, wherein said information unit monitor detects communication history information including a dial number, a communication time, an error state and communication protocol by monitoring the signal inputted to/outputted from the information unit.

12. The facsimile apparatus according to claim 7, wherein said facsimile section monitor functions as a receiving monitor for monitoring whether or not the facsimile section cannot receive data due to an internal factor, and said control means controls the facsimile section and the information unit based upon the result detected by said receiving monitor so that the image information inputted to the facsimile section is stored in the information unit.

13. The facsimile apparatus according to claim 12, wherein said facsimile section includes a handset for sending/receiving sound via the telephone line, and a sound modem for modulating and demodulating a sound signal, said information unit includes a modem for inputting/outputting a data signal including a sound signal via the telephone line, the specific signal is an output signal from said facsimile section, said related one of the reference identification signals is a specific reference identification signal representing the information unit, and when said facsimile section monitor discriminates that the output signal coincides with the specific reference identification signal representing the information unit, said control means controls said switching means to connect the handset to the information unit.

14. The facsimile apparatus according to claim 13, wherein said related one of the reference identification signals is a hooking signal, representing whether or not the handset is hooked, and when said facsimile section monitor discriminates that the output signal is the hooking signal, said control means controls said switching means to connect the facsimile section to the information unit.

15. The facsimile apparatus according to claim 1, wherein the specific signal is a caller's identification signal inputted from the telephone line permitting external input of a data signal, said related one of the reference identification signals is a specific reference identification signal representing the facsimile section or the information unit, the telephone line monitor compares the identification signal inputted from the telephone line with the specific reference identification signal and outputs a signal representing coincidence or non-coincidence of said signals, and said control means controls said switching means, based upon the output from the telephone line monitor, to connect the telephone line to the facsimile section or the information unit.

16. The facsimile apparatus according to claim 1, wherein said facsimile section includes a start switch directing said facsimile section to be operated, said facsimile section monitor detects an ON/OFF state of the start switch, said telephone line monitor detects existence or non-existence of a connecting signal when said facsimile section is externally connected via the telephone line, said specific signal is a calling-out signal from the information unit, said related one of the reference identification signals is a specific reference identification signal representing the facsimile section, and when said facsimile section monitor detects the OFF state of the start switch and said information unit monitor discriminates that the calling-out signal is the specific reference identification signal representing the facsimile section, said control means controls said switching means to connect said facsimile section to said information unit.

17. A communication method of a facsimile apparatus, comprising the steps of:

monitoring input and output of a signal to/from a facsimile section by a facsimile section monitor;

monitoring input and output of a signal to/from a telephone line by a telephone line monitor;

monitoring input and output of a signal to/from an information unit including a modem, which inputs/outputs a data signal including information via the telephone line, by an information unit monitor;

detecting communication history information, including at least one of a dial number, a communication time, an error state and communication protocol, by monitoring signals inputted to/outputted from the information unit;

storing communication history information relating to facsimile communication via the telephone line;

controlling the facsimile section so that the communication history information relating to the information unit and the communication history information relating to the facsimile section are stored in the memory in a united manner;

comparing a reference signal, related to the detecting of a specific signal and selected from a discrimination memory storing predetermined reference identification signals, to the detected specific signal when the specific signal is detected by at least one of said facsimile section monitor, telephone line monitor and information unit monitor; and selectively connecting two of said facsimile section, telephone line, and information unit having the modem, according to whether or not the specific signal coincides with the selected reference identification signal.

18. The communication method of a facsimile apparatus, according to claim 17, further comprising the steps of:

detecting an ON/OFF state of a start switch for directing a facsimile section to be operated by said facsimile section monitor; and detecting existence or non-existence of a connecting signal by said telephone line monitor when the facsimile section is externally connected via a telephone line, wherein when the ON state of the start switch is detected and the non-existence of the connecting signal is detected, said switching means is controlled to connect the facsimile section to the information unit.

19. The communication method of a facsimile apparatus according to claim 17, further comprising the steps of:

detecting an ON/OFF state of a start switch for directing a facsimile section to be operated by said facsimile section monitor; and monitoring existence or non-existence of a calling-out signal from an information unit by said information unit monitor and comparing the calling-out signal with a reference identification signal representing the facsimile section as said selected reference identification signal, wherein when the OFF-state of the start switch is detected and the calling-out signal coincides with the reference identification signal, said switching means is controlled to connect the facsimile section and the information unit.

20. The communication method of a facsimile apparatus according to claim 17, comprising the steps of:

detecting an ON/OFF state of a start switch for directing the facsimile section having a sound modem for modulating/demodulating a sound signal to be operated by said facsimile section monitor;

monitoring existence or non-existence of a calling-out signal from the information unit having a modem for inputting/outputting a data signal including a sound signal to/from a telephone line by said information unit monitor, and comparing the calling-out signal with a first reference identification signal representing the facsimile section as said selected reference identification signal; and monitoring an output signal from the facsimile section by said facsimile section monitor and discriminating whether or not the output signal is a second reference identification signal representing the information unit, as said selected reference identification signal, wherein when the OFF state of the start switch is detected and the calling-out signal coincides with the first reference identification signal or when the output signal coincides with the second reference identification signal, said switching means is controlled to connect the information unit to a handset included in the facsimile section so as to send/receive sound via the telephone line.

* * * * *